United States Patent [19]
Rios

[11] 4,120,564
[45] Oct. 17, 1978

[54] READING STAND WITH MAGNIFIER

[76] Inventor: Roberto Rios, 533 E. 182nd St., Carson, Calif. 90746

[21] Appl. No.: 765,975

[22] Filed: Feb. 7, 1977

[51] Int. Cl.² .............................................. G02B 27/02
[52] U.S. Cl. .................................... 350/241; 350/247
[58] Field of Search ............... 350/235, 238, 239, 241, 350/247, 250

[56] References Cited
U.S. PATENT DOCUMENTS

| | | | |
|---|---|---|---|
| 2,090,346 | 8/1937 | De Vore | 350/241 UX |
| 2,127,711 | 8/1938 | Baldauf | 350/241 |
| 2,604,009 | 7/1952 | Walrath | 350/241 |

*Primary Examiner*—F. L. Evans
*Attorney, Agent, or Firm*—Albert M. Herzig; Edward C. Walsh

[57] ABSTRACT

A reading stand is provided having a base and holder for holding material to be read in a predetermined position. The base supports a frame which carries a magnifying glass in a position to magnify the reading material and to be easily seen. The holder for the reading material is adjustable from the front part of the device towards and away from the magnifying glass. The frame provides simplified up and down and transverse adjustments of the magnifying glass relative to the holder.

5 Claims, 5 Drawing Figures

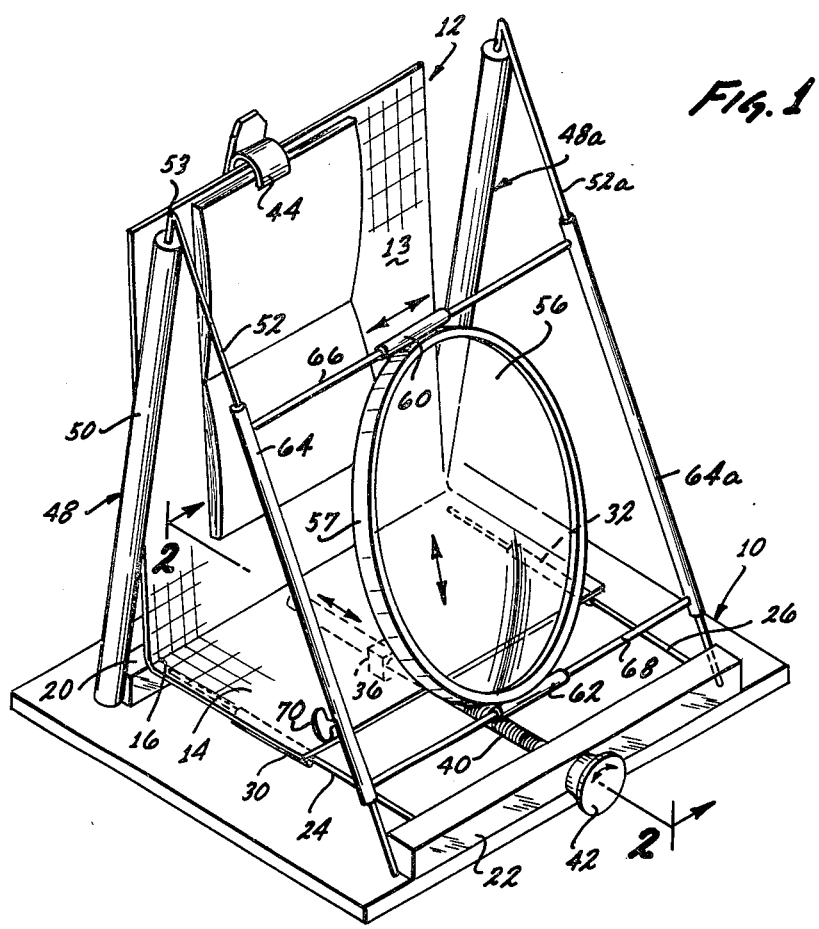
Fig. 1
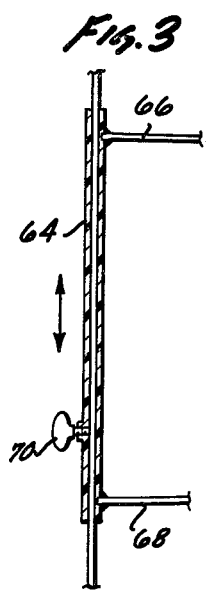
Fig. 3
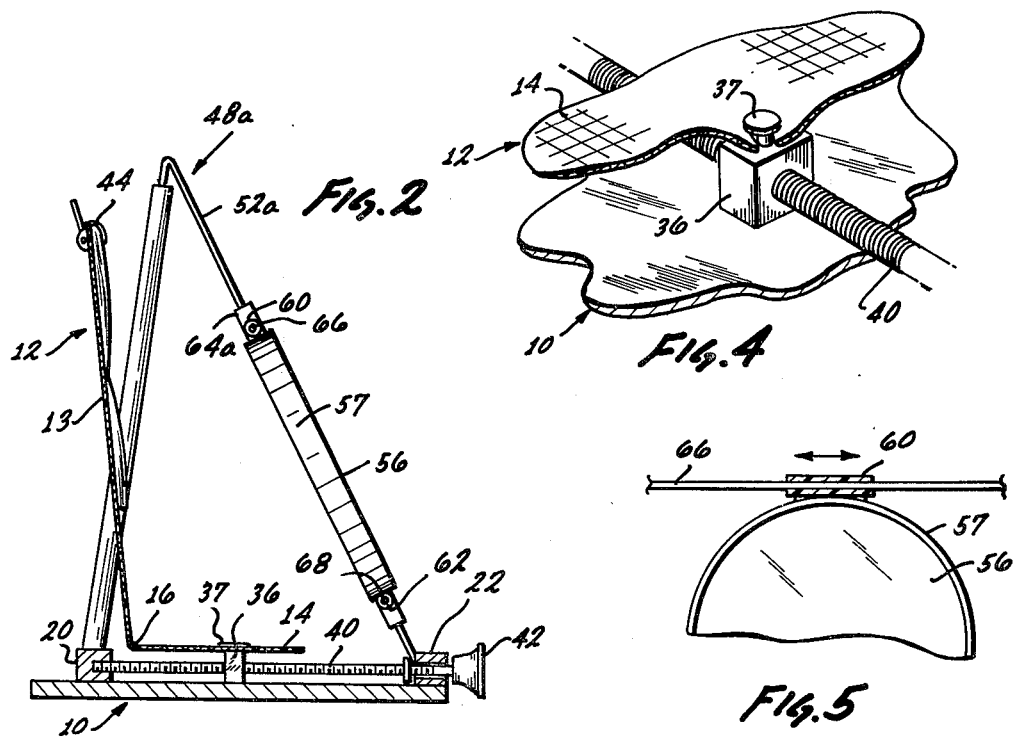
Fig. 2
Fig. 4
Fig. 5

READING STAND WITH MAGNIFIER

BACKGROUND OF THE INVENTION

1. Field of the Invention

The field of the invention is that of holders for reading material or reading stands of the type that provide a holder for the reading material in association with a magnifying glass.

2. Description of the Prior Art

Types of reading devices with magnifying means are shown in U.S. Pat. Nos. 245,927; 1,892,745; 1,983,439; 2,127,711; and 2,604,009. The prior art leaves room for improvement with respect to certain characteristics of devices of this general nature and category. It is considered that the deficiencies reside particularly in the characteristics in the combination of stable supporting base means; effective holding means for the material to be read; in combination with a convenient adjustment for the position of the holder for the reading material relative to the magnifying means and relative adjustments of the magnifying means in two planes.

SUMMARY OF THE INVENTION

A preferred exemplary embodiment of the invention is described in detail herein. In the exemplary form of the invention it is provided with a supporting base. Carried on the base is a holder or carrier for the reading material which preferably may be constructed of wire mesh screen, and it is provided with a fore and aft adjustment from the front of the device which is convenient to the user.

Triangular side frames or members are provided upstanding from the base. The front legs of these frame members support and carry the magnifying member which may preferably be a circular lens which is mounted from the leg members to provide for very easy up and down adjustment of the magnifier as well as transverse or sideways adjustments.

The primary object of the invention is to realize improved characteristics of stability and adjustments of positioning of the reading material holder and the magnifying lens in a reading stand or holder.

A further object is to realize improved characteristics as to accessibility and convenience of adjustment of positioning of the holder for the reading material and the positioning of the magnifier relative to it.

Further objects and additional advantages of the invention will become apparent from the following detailed description and drawings.

BRIEF DESCRIPTION OF THE DRAWINGS

FIG. 1 is an isometric view of a preferred form of the invention;

FIG. 2 is a sectional view taken along the line 2—2 of FIG. 1;

FIG. 3 is a detail sectional view of one side of the frame of FIG. 1;

FIG. 4 is a detail view of a part of the adjustment for the holder;

FIG. 5 is a detail view of the upper mounting of the magnifier.

DESCRIPTION OF THE PREFERRED EMBODIMENT

Referring to FIG. 1 of the drawings, the article in the preferred exemplary form includes a base stand 10 which may be made of any suitable material such as wood or plastic or the like. Supported for fore and aft movement on the base is the holder or carrier for the reading material as designated at 12. This member be made of various different types of material but preferably it is constructed of wire mesh material having a vertical part 13 and a horizontal part 14. The bend 16 in the member 12 in an extreme position is adjacent cross member or transverse member 20 on the base which is similar to another cross member or transverse member 22 at the front of the article. These cross members may be made of wood, plastic or other suitable material.

Extending between the members 20 and 22, are slide rods 24 and 26. Slidably carried on these rods are tubular members or sleeves 30 and 32 and the horizontal portion 14 of the carrier or holder 12 is attached to these sleeves so that the holder or carrier 12 can be moved fore and aft, that is forward and backward, with the sleeves 30 and 32 sliding on the rods 24 and 26.

Carried on the underside of the horizontal portion 14 of the holder or carrier 12 is a block 36 having a threaded bore. Block 36 is attached to the horizontal portion 14 by way of rivet 37. Extending through the threaded bore of the block 36 is a lead screw 40 which extends through a bore in the cross member 22 and on the end of it is an adjusting knob 42.

Reading material of any type can be conveniently attached to the vertical part 13 of the holder or carrier 12 by means of a clip 44. Holder 12 can readily be adjusted fore and aft, that is forward and backward, by adjusting the knob 42 which rotates the lead screw 40 and moves the block 36.

At the sides of the device are triangular frames as designated at 48 and 48a, these frames being alike. The frame 48 includes member 50 which may be made of wood or metal upstanding from the base 10 as shown. The frame includes a second member 52 which may preferably be formed of wire or rod material which extends upwardly from the base adjacent to the cross member 22 and is shown, its other end is bent, as indicated at 53 and attached to the member 50 such as by extending into a hole in the end of this member. Frame 48a is like the frame 48.

Numeral 56 designates a magnifying glass or lens which as shown is circular although it may have any convenient shape having a frame 57. Attached to the upper side of the frame 56 is a guide sleeve 60 and attached to the lower side of it is another guide sleeve 62. Carried on the frame member 52 is a tubular sleeve 64 and carried on the frame member 52a is a similar tubular sleeve 64a. Extending between the upper ends of the guide sleeves 64 and 64a is a rod 66 which extends through the guide sleeve 60. Extending between the lower ends of the guide sleeves 64 and 64a is a rod 68 which extends through the guide sleeve 62. As may be seen, the magnifying lens 56 may be readily adjusted laterally simply by moving it laterally with the guide sleeves 60 and 62 sliding on the rods 66 and 68. The frame formed by the guide sleeves 64 and 64a and the rods 66 and 68 can be slid up and down manually on the rods or frame members 52 and 52a. It may be set in any convenient position by means of the wing nut 70.

From the foregoing, those skilled in the art will readily understand the nature of the device and its manner of usage and will appreciate its improved characteristics. By reason of the flat base 10 the device is very stable irrespective of the size or weight or the type of reading material that is held by the carrier 12. The fore and aft position of the carrier 12 is easily and conveniently adjusted from the front of the device by rotating the knob 42, making possible very close and firm adjustments. The magnifier 56 is easily adjusted manually either up or down or laterally and can be set in any desired position. Overall, the device is of simplified and economical construction, being capable of being fabricated from inexpensive and readily available materials.

The foregoing disclosure is representative of the preferred form of the invention and is to be interpreted in illustrative rather than a limiting sense, the invention to be accorded the full scope of the claims appended hereto.

What is claimed is:

1. As an article of manufacture, a reading and magnifying stand comprising in combination, a base, a carrier for reading material having an upright part positioned for fore and aft adjusting movement relative to the base, a magnifying lens and a supporting frame for the lens positioned to carry the lens forwardly of the said carrier and means for adjusting the magnifying lens in directions normal to each other, the carrier including adjusting means adjustable from the front of the article from a position in front of the magnifying lens, the said adjusting means comprising a lead screw cooperable with a block carried by the said carrier and having an adjusting knob at its end.

2. An article as in claim 1, wherein said carrier is formed of sheet material having an upright part and horizontal part positioned over the said base.

3. An article as in claim 2, wherein said frame carrying the lens comprises generally upright members at the sides of the base, sliding guide members cooperable with said generally upright members, transverse means extending between said sliding guide members, sliding guide members cooperable with the said transverse means, and the said magnifying lens being carried by said last sliding guide members whereby the magnifying lens is manually adjustable in two directions normal to each other.

4. An article as in claim 3, including inverted V-shaped supports at the sides of the base, said upright members constituting parts of said supports.

5. An article as in claim 1 wherein said supporting frame includes generally upright members, the said upright part of the carrier being between said upright members.

* * * * *